(12) United States Patent
Nair et al.

(10) Patent No.: US 11,853,268 B2
(45) Date of Patent: *Dec. 26, 2023

(54) DECLARATIVE SEGMENT ATTRIBUTE ACTIVATION

(71) Applicant: Salesforce Inc., San Francisco, CA (US)

(72) Inventors: Vineeth Anand Nair, Mountain House, CA (US); Alan Mathias Hoffman, Orem, UT (US); Nigel Wallace Menger, Halifax (CA); Neil Raymond Parsons, Bedford (CA); Kasia Fichtner, Moraga, CA (US); Pamela Sue Walquist, Carmel, IN (US); Sarah Flamion, Newburgh, IN (US); Matthew Westover, Orinda, CA (US); Jamin Hall, Suwanee, GA (US); Ashok Shivarudraiah, Fremont, CA (US)

(73) Assignee: Salesforce Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,895

(22) Filed: Jan. 26, 2021

(65) Prior Publication Data

US 2022/0121629 A1 Apr. 21, 2022

Related U.S. Application Data

(60) Provisional application No. 63/094,267, filed on Oct. 20, 2020.

(51) Int. Cl.
*G06F 16/00* (2019.01)
*G06F 16/21* (2019.01)
(Continued)

(52) U.S. Cl.
CPC ........ *G06F 16/211* (2019.01); *G06F 3/04842* (2013.01); *G06F 9/451* (2018.02);
(Continued)

(58) Field of Classification Search
None
See application file for complete search history.

(56) References Cited

U.S. PATENT DOCUMENTS

| 2005/0015364 | A1* | 1/2005 | Payton | G06F 16/2428 |
| 2010/0115446 | A1* | 5/2010 | Fastabend | G06F 16/2423 715/781 |
| 2012/0079038 | A1* | 3/2012 | Hersh | H04L 67/306 709/206 |

* cited by examiner

*Primary Examiner* — Anhtai V Tran
(74) *Attorney, Agent, or Firm* — Holland & Hart LLP

(57) ABSTRACT

A method for data processing includes identifying, for communication of a content object, a segment of entities based at least in part on a selection of a first attribute at a user interface. The first attribute may be selected from attributes defined by a data model and configured for a tenant of a multi-tenant system. The method further includes activating a set of attributes of the plurality of attributes based at least in part on the identified segment of entities and the data model. The method further includes, receiving a selection of a second attribute of the set of attributes, identifying, for the segment of entities, a set of inputs corresponding to the selected second attribute, and transmitting, to a content communication system for distribution of the content object, an indication of a plurality of entity identifiers corresponding to the segment of entities and the set of inputs.

18 Claims, 10 Drawing Sheets

(51) Int. Cl.
*G06F 9/451* (2018.01)
*G06F 16/2455* (2019.01)
*G06F 16/28* (2019.01)
*G06F 16/248* (2019.01)
*G06F 3/04842* (2022.01)

(52) U.S. Cl.
CPC ........ *G06F 16/248* (2019.01); *G06F 16/2455* (2019.01); *G06F 16/285* (2019.01)

DECLARATIVE SEGMENT ATTRIBUTE ACTIVATION

CROSS REFERENCE

The present Application for Patent claims the benefit of U.S. Provisional Patent Application No. 63/094,267 by Nair et al., entitled "DECLARATIVE ENTITY SEGMENTATION AND SEGMENT ATTRIBUTE EXTENSION," filed Oct. 20, 2020, assigned to the assignee hereof, and expressly incorporated by reference herein.

FIELD OF TECHNOLOGY

The present disclosure relates generally to database systems and data processing, and more specifically to declarative segment attribute activation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support content distribution to users. In some cases, the cloud platform may support a service that supports segmenting users into groups based on profiles and other attributes. These segments may be used for marketing purposes, such as content distribution, to a particular set of a target users having some attribute similarities.

DETAILED DESCRIPTION

Figure 1:
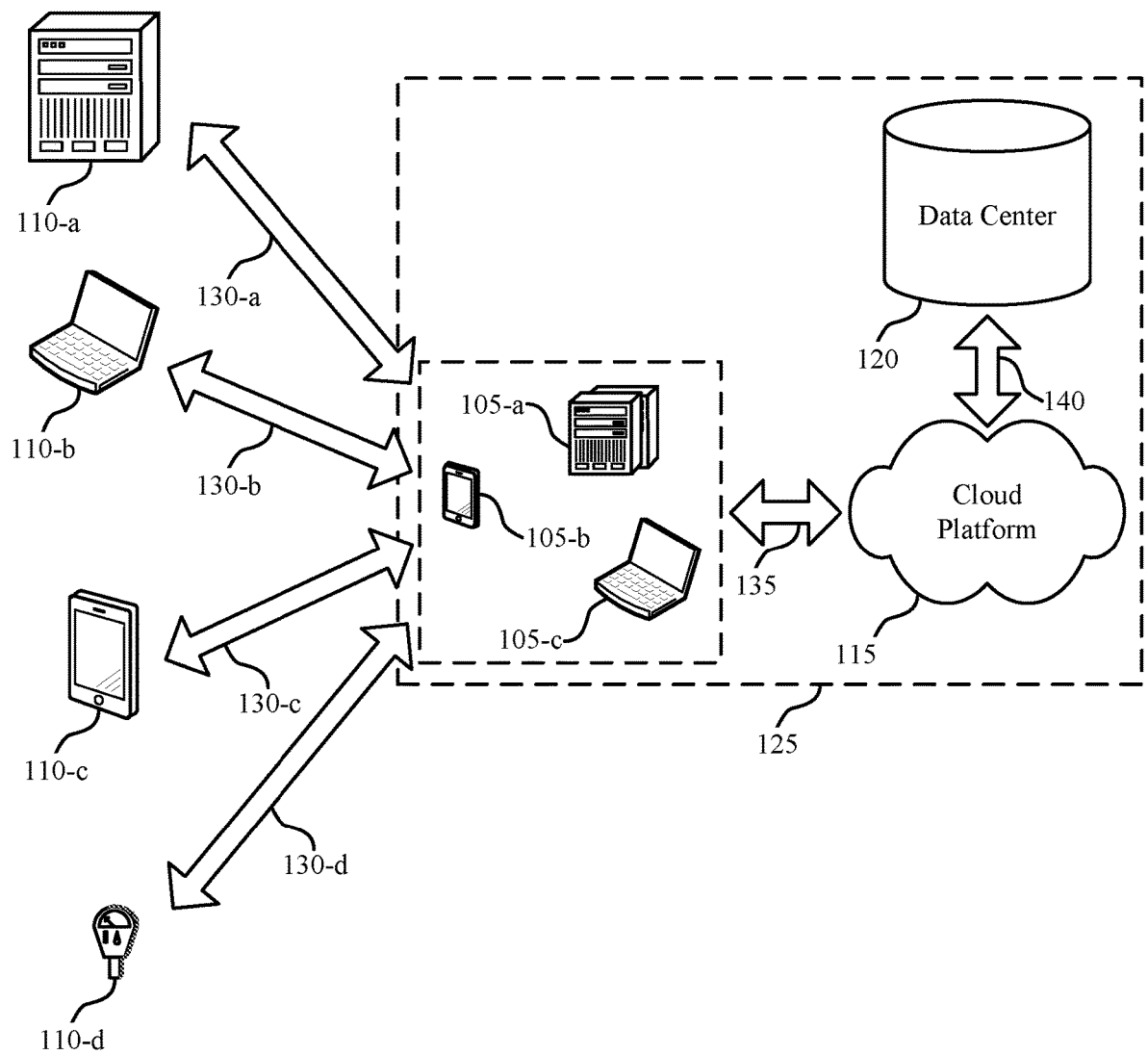
FIG. 1 illustrates an example of a data processing system that supports declarative segment attribute activation in accordance with aspects of the present disclosure.

In some examples, a cloud platform may support a customer data platform. A customer data platform may include one or more applications or services and may support functionality to ingest data from multiple sources, parse and analyze the data to define and build segments of users or entities based on attributes and profile data. These attributes may be inferred or may be explicit attributes, such as age, gender, interests, spending habits, browsing history, etc. The customer data platform may utilize these attributes to categorize or identify segments of related entities. In some examples, these segments of associated entities may be used for content distribution, such as for distribution of marketing content of a marketing campaign.

In some examples, the customer data platform may support a plurality of different tenants or organizations. Each tenant may be configured with a separate data model defining attributes and entities. The customer data platform may support selection of an entity class and one or more attributes associated with the entity class, and identification of a segment of entities based on these selections. The customer data platform may identify the segment of entities that includes entities that are associated with the selected attributes according to the data model. In some examples, the user may select operators and qualifiers to limit or define the attributes for identifying the segment. After the segment is identified based on the attributes and other user selections, the customer data platform may transmit an indication of entity identifiers associated with the segment to a content communication system for distribution of content to devices associated with entities of the segment.

Techniques described herein support identification of a richer set of data for use by the content communication system. After the segment of entities is identified, the customer data platform may activate a set of additional attributes that may be selected. The user may select one or more of the additional attributes, and the customer data platform may identify inputs or values associated with the selected attributes as defined in the data model. The values identified for the segment of entities may be transmitted with the listing of the entity identifiers to the customer data platform. The content communication system may leverage the additional attribute data for a more customized content distribution scheme. For example, the content distribution system may be configured to transmit two messages to devices associated with entities corresponding to users that have spent more than $500 in a defined time period (as reflected in the data model) while being configured to transmit one message to devices associated with entities corresponding to users that have spent less than $500 in the defined period.

In some cases, the additional attributes may be calculated by the content distribution system. In the spend amount example addressed above, the system may calculate the spend amount for each entity of the segment. Thus, after selection of the attribute (e.g., spend amount), the customer data platform may generate and execute a database query that identifies the spend amount for each entity of the segment. This calculation may include aggregating a spend for multiple purchase attributes associated with an entity. Due to the configuration of the data model for various tenants, the inputs or values for these attributes may be calculated or identified without normalizing the data or combining database tables, which may incur significant processing overhead.

Aspects of the disclosure are initially described in the context of an environment supporting an on-demand database service. Aspects of the disclosure are further described with respect to a system diagram for segmentation and activation, a system diagram for attribute identification, and a process flow diagram. Aspects of the disclosure are further illustrated by and described with reference to apparatus diagrams, system diagrams, and flowcharts that relate to declarative segment attribute activation.

FIG. 1 illustrates an example of a system 100 for cloud computing that supports declarative segment attribute activation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a segmentation application accessible at one or more of the cloud clients 105. The segmentation application may be utilized to identify segments of entity identifiers based on attributes associated with entities identifiers. A user of a cloud client 105 may utilize the application to identify a segment of entities that are to receive a content item (e.g., marketing content).

Some systems may identify segments of user identifiers based on attributes associated with the user identifiers. Such systems may identify user identifiers associated with the segment and use the user identifier to distribute content. Such systems may not support access to the attribute data for distribution of content, as this data may not be available for a content communication system. Further, these systems may require database normalization or data table combining in order to support attribute identification, which may incur significant processing and memory overhead.

Aspects of the present disclosure support a customer data platform (e.g., implemented in cloud platform 115) that supports different data models for various tenants (e.g., cloud clients 105) of a multi-tenant system. The data model may be leveraged to support declarative entity segmentation based on attribute data, in addition to providing attribute data to a content communication system for improved content distribution schemes. After a segment of entity identifiers of a data model is identified based on attribute data associated with various entities, the customer data platform supported by cloud platform 115 may provide a user the option to select attribute data for the entities of the segment. Based on the user selection, the customer data platform may identify values corresponding to the selected attribute for one or more of the entities of the segment. The identified values may be listed in association with the entity identifiers and used by the content communication system for a custom content distribution scheme. Because the system leverages the existing data model, the system may not require data normalization to identify values or inputs, and as such, may not incur processing and memory overhead.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system described herein, a marketing manager may want to define a segment called "Premium Shoe Fans." The user may select "Sales Order" product" as an initial attribute, and the system may generate a container in the user interface as well as an aggregation operator for sales orders. The user may select "count" (aggregation operators) and "at least" (qualifier) and "1" (value or input) such that the user has made at least one purchase. Within the container the user may select a "Product Description" attribute and "Model Year" attribute and define the expressions such that the product description contains "shoe" and the model year is 2019. The user may accept the expression, and the system may identify entities associated with users or entities that have purchased at least one shoe that is a 2019 model. After this segment is identified, the system may prompt the user to select additional attributes for activation. The user may select spend amount, and the system may determine a spend amount for each user of the segment and append this information to the list of entity identifiers. This information may be used by the content distribution system to provide customized content to users associated with the entities, such as different content to different users based on the spend amount. This and other examples are further described with respect to the following figures.

Figure 2:
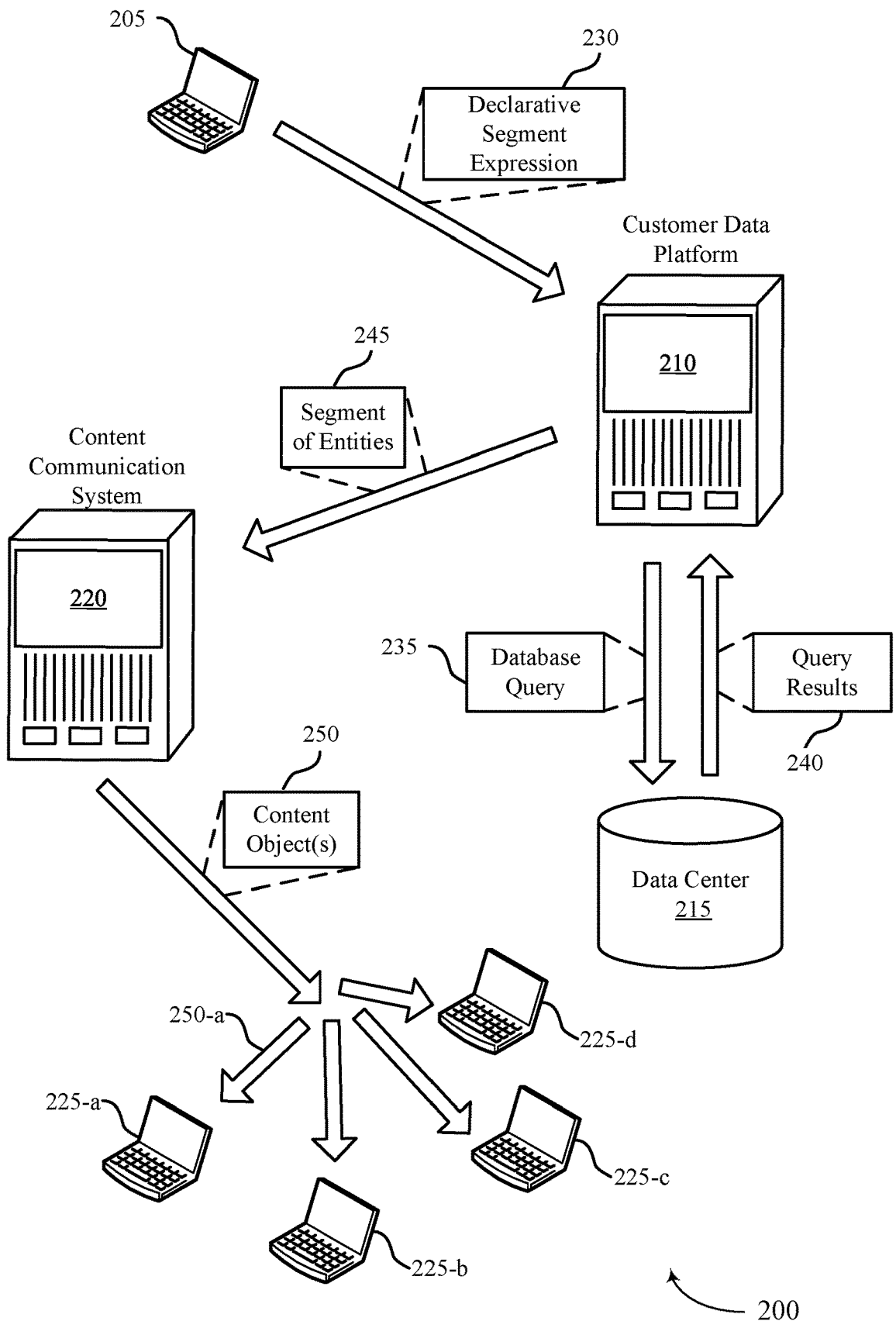
FIG. 2 illustrates an example of a system that supports declarative segment attribute activation in accordance with aspects of the present disclosure.

FIG. 2 illustrates an example of a system 200 that supports declarative segment attribute activation in accordance with aspects of the present disclosure. The system 200 includes a customer data platform 210 and a content communication system 220. The customer data platform 210 and/or the content communication system 220 may be implemented in various computing systems, such as one or more servers as described with respect to cloud platform 115 of FIG. 1. More particularly, the cloud platform 115 may include various computing systems that support various services, such as the customer data platform 210 and the content communication system 220. In some examples, the customer data platform 210 and the content communication system 220 may be implemented in the same physical and/or logical computing systems. In some cases, the content communication system 220 may be a service supported by the customer data platform 210 or some other similar platform or service.

The customer data platform 210 may support various services, including, and without limitation, an entity segmentation service. As described with respect to FIG. 1, the entity segmentation service may be configured to support a plurality of tenants (e.g., cloud clients 105). Each tenant may be configured with a respective data model that is stored in and managed by aspects of data center 215, which may be an example of a data center 120 of FIG. 1. Each data model may include a plurality of entities that are associated with respective entity identifiers. The entities may be associated with one or more users (e.g., a contact 110 of FIG. 1), which may be an example of customers, prospective customers, a team, a group of users, or the like. Each entity identifier may be associated with various attributes defined by the data model. The attributes may correspond to various characteristics, such as purchase history, web-behavior data, user characteristics (e.g., name, address, email address, age, gender, geographic location), among other attributes. The customer data platform 210 may monitor and augment the data model based on various user behaviors. For example, when a user purchases a product/service using a platform (e.g., an online store) supported by a tenant, data associated with the purchase may be augmented to the data model, and more particularly, to one or more entity identifiers associated with the user.

The data model may define various attributes that may be associated with entities, and the available attributes may be defined in association with entity type or entity class by the data model. In some examples, the entity is associated with a client (e.g., a client device, application, or the like) that the user utilizes to access various services. As such, each user may be associated with a plurality of entity identifiers. For example, a user may be associated with a respective individual entity identifier (corresponding to an individual entity class) for a mobile device or mobile device application and a desktop. In some cases, a user may be associated with an entity identifier for the user in a physical store. Further, the model for each tenant may define the respective relationships between entities. For example, each individual entity identifier (e.g., corresponding to the user in a store, using a mobile device, and using a desktop) may be associated with a unified entity (a unified individual entity class) with a respective identifier. Thus, this unified entity may be a "parent entity" or may have a parent relationship with each individual entity corresponding to the user for the respective clients or at a physical store. As such, each individual entity may be a "child entity" or have a child relationship with the unified entity. The customer data platform 210 may support a technique or service that identifies individual entities that correspond to the same user.

Other types of relationships may also be defined by the data model for a particular tenant. In some examples, the relationships between entity classes may be hierarchical relationships. For example, a set of individual entities or unified individual entities may be associated with a group entity (e.g., a group entity class). In one example, the group entity may be a household entity that corresponds to individuals of a household. In other example, a group entity may correspond to a team of individuals at an organization or firm. As such, the group entity may function as a parent entity of other entities. Similarly, group entities may also be associated with a parent entity. For example, an organizational or firm entity may be a parent entity of multiple group entities.

As discussed herein, the attributes that are available for the data model may vary for different tenants. Further, attributes may be associated with various sub-attributes or related attributes. For example, a purchase attribute may include sub-attributes that include the product name, price, date, and other product specifications. As described, the data model for the particular tenant may define these various types of relationships as well as the attributes. Further, the data model may maintain the relationships of various entities and the attributes that are associated with the entities. For example, database tables may maintain the entities, the attributes associated with the entities, sub-attributes, and other such information. Since some attributes may include sub attributes, a series of database tables may be configured for a data model. For example, a table may be configured for a purchase, and thus, multiple purchase tables may be associated with a particular entity, where each table includes information associated with a particular purchase. Other database configurations are contemplated within the scope of this disclosure.

The segmentation service supported by the customer data platform 210 may leverage the data model and the defined attributes and entity relationships for segment generation. In some cases, a marketing manager or another user (e.g., an employee of a tenant) may access the customer data platform for segment generation. A segment may be used for distribution of content (e.g., content objects). For example, the marketer may wish to identify a segment of the tenant subscribers or customers for marketing purposes. Rather, than sending content object to all subscribers or customers, the marketer may wish to define a segment of their subscribers for targeted marketing. For example, a user may utilize a user device 205, which may be an example of a device of a cloud client 105 or tenant, to access the segmentation service. The customer data platform 210 may support a user interface which the user may access to select an entity class, attributes, and the like for segment generation. For example, the user may select an entity class supported by the data model of the particular tenant. The selected entity class may be the basis for segment generation, meaning that the resultant segment may include entities of the selected entity class. After selection of the entity class, the segmentation service may display a set of selectable attributes for the selected entity class. The user may select one or more attributes, one or more operators, and other declarative components for generating a segment definition (e.g., a declarative segment expression 230). Based on the user selection of the attributes and other parameters, the customer data platform 210 may generate a database query 235 and execute the database query 235 on the database associated with the data model for the particular tenant. As described, the database may be managed by the data center 215, which may be integrated with or supported by the customer data platform 210.

In response to execution of the database query 235, a set of query results 240 may be surfaced. The query results 240 may correspond to a set of entity identifiers associated with entities that satisfy the declarative segment expression 230. For example, the declarative expression may correspond to "users that have spent more than $500 in the last year." In this example, the query results 240 may be list of entity identifiers (from the data model) that correspond to users that have spent more than $500 in the past year. Thus, this list of entity identifiers may be the identified segment of entities. It should be understood that many different types of attributes, values, and combinations of these may be used to define a segment.

After generating the segment of entities using the features supported by the customer data platform, the entity identifiers corresponding to the segment of entities 245 may be transmitted to or indicated to the content communication system 220. The content communication system 220 may support scheduling distribution, managing distribution, and the actual distribution of content objects 250 to user devices 225 that are associated with entities of the segment of entities 245. In some cases, a user may access the content communication system 220 for configuring a content object distribution schedule and frequency. The content communication system 220 may also monitor various feedback metrics associated with the distributed content object 250, such as click rate and open rate. These metrics may be further used to refine the content distribution schedule, among other features. The content communication system 220 may support distribution of the content object 250 using various channels, such as email, social media, search advertising, video advertising, mobile push, among other channels. Thus, the various identifiers or addresses for the various channels for users/entities may be maintained in association with the entities. In some cases, the distribution of content to the segment of entities may be referred to as segment activation.

Techniques described herein support appending attribute information to the entity identifiers for use by the content communication system 220. After the segment of entities 245 is identified using the described techniques, the customer data platform 210 may support prompting a user for selection of additional attributes for use by the content communication system. Various attributes may be activated by the customer data platform 210 for selection. Activation of the attributes may include identifying attributes that may be selectable based on the data model for the particular tenant, and transmitting a response to the client (e.g., user device 205) that includes an indication of the selectable attributes. In some examples, the customer data platform 210 may generate and execute a database query 235 to identify the selectable attributes.

If the user selects one or more attributes, then the customer at platform 210 may generate a query based on the selected attributes. The query may identify the values or inputs for the attribute for each entity of the segment (or a subset of the entities of the segment). Thus, for one or more of the entities, the query identifies the value for a selected attribute. For example, if the user selects sales order or spend amount, then the system may calculate the spend amount for each user corresponding to the segment of entities. The identified data may be appended to the list that is transmitted to the customer data platform, such that each entity of the segment is associated with an identified value (e.g., spend amount). The content communication system 220 may use the additional information for a customized or personalized content distribution scheme.

For example, the content communication system 220 may utilize gender data to support gender specific engagement, birth date data to support age specific recommendations, purchase date information to support continued engagement, etc. Thus, rather than such information not being available for the content communication system 220, the customer data platform 210 and the tenant specific data model may be leveraged to identify such information and provide the information to the content communication system 220. The customer data platform 210 supports a declarative technique for identification of the attribute data, as described herein.

Figure 3:
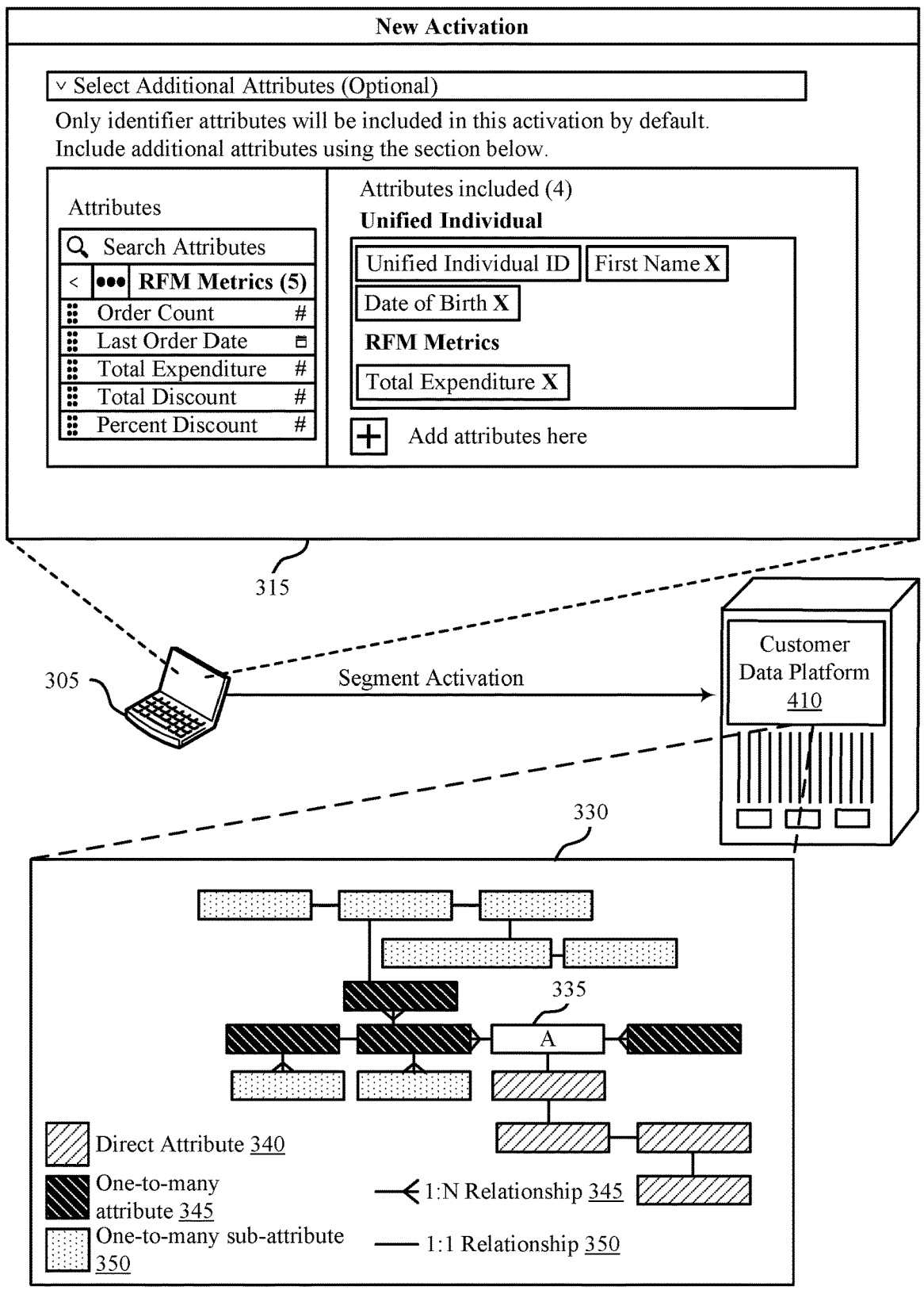
FIG. 3 illustrates an example of a system that supports declarative segment attribute activation in accordance with aspects of the present disclosure.

FIG. 3 illustrates an example of a system 300 that supports declarative segment attribute activation in accordance with aspects of the present disclosure. The system 300 includes a user device 305 and a customer data platform 310. The customer data platform 310 may be an example of the customer data platform 210 of FIG. 2. The customer data platform 310 may support various services for multiple tenants of a multi-tenant system. For example, the customer data platform 310 may support a segmentation service, as described with respect to FIG. 2. Further, the customer data platform 310 may maintain, manage, and augment data models for various tenants. Each data model includes entities and attributes associated with the entities. The data models may be augmented based on various customer or subscriber behavior using platforms and services supported by the tenants. In some examples, the data model is augmented using data received from other parties, organizations, or services, such as search platform that monitors user search behavior.

The customer data platform 310 may support a user interface 315 that may be used for various services, such as segmentation and activation, and the user interface 315 may be accessed via user device 305. A user may access the customer data platform 310 via user interface 315 to generate a segment of entity identifiers based on selection of an attribute and a data model for a particular tenant. For example, the user may select at least one attribute, a qualifier, a value, or a combination thereof to define a filter for segment identification. The customer data platform may identify the segment based on the user selections. After the segment is generated, the customer data platform 310 may prompt, via the user interface 315, the user to select one or more additional attributes. The additional attributes may be activated for selection based on the data model for the particular tenant.

The customer data platform 310 may surface the attributes for selection based on the data model for the particular tenant. Data model portion 330 illustrates an example portion of a data model for a tenant. The data model portion 330 includes an entity 335 and illustrates attributes that are associated with the entity 335. The data model portion 330 is for illustrative purposes, and the data model may be represented in database tables. The entity 335 may be associated with various direct attributes 340 and one-to-many attributes, which may be one-to-many attributes 345 and one-to-many sub-attributes 350. A direct attribute 340 may have a 1:1 relationship with the entity 335 or with the entity via another attribute. In one example, a direct attribute may be person attribute, which may include values such as name, identifier, etc. and a passport attribute may be associated with the person attribute. The passport attribute may include multiple attributes, such as identifier, expiration data, etc. A one-to-many attribute 345 may include a purchase order, for example. There may be multiple purchase orders associated with the entity 335, and each purchase order attribute may have a set of one-to-many sub-attributes 350.

Depending on the type of entities (e.g., entity class) in the segment—e.g., whether the entities of the segment correspond to an individual, unified individual, or group—the customer data platform may surface the available attributes for that entity class for selection by the user. For example, according to the data model for the particular tenant, a first subset of attributes may be associated with a group entity, and a second subset of attributes may be associated with an individual entity. Thus, if the segment of entities includes the entity 335, then the customer data platform 310 may surface attributes listed in the data model portion 330 for selection by the user.

In some examples, the user may select a name attribute, date of birth attribute, or other similar direct attributes 340. In such cases, the customer data platform 310 may identify the values for the selected attribute for each entity (e.g., the name of the user associated with each entity and the date of birth of the user associated with the entity). In other cases, the user may select calculatable attributes, such as a one-to-many attribute 345. In some cases, these attributes correspond metrics, such as marketing metrics. Marketing metrics may be recency, frequency, and monetary value (RFM) metrics. These metrics may be based on spend amount or total expenditure. As such, if the user selects total expenditure for an attribute, then the customer data platform 310 may traverse the data for each entity to identify the spend amount. For example, for entity 335, the customer data platform may aggregate spends (e.g., using a database query) for a set of sales order attributes to identify (e.g., aggregate) the total expenditure. This process may be repeated for one or more of the entities of the segment.

In some examples, the user interface 315 may support a user providing a qualification for a particular attribute. For example, if the user selects the total expenditure attribute, the user may also be able to select a timed domain qualification, such as total expenditure in the last year, in a previous year, etc. As such, the customer data platform 310 may generate a database query to identify the qualified metric for each entity of the segment. In some cases, the customer data platform 310 may support complex expression. For example, if the users selects a one-to-many attribute, then the system may display an aggregation function, qualifier, etc., that the user may use to further define or limit an attribute for identifying the corresponding value. In some cases, the system may support computing a lifetime value for each entity using various attributes. Thus, in some cases, a selectable attribute may be associated with a predefined formula or expression for identifying the value for the selected attribute (based on attributes in the data model).

The customer data platform may query the data model to identify the value(s) for the selected attribute(s) and associate the identified values with the respective entity identifier. A record or listing of the entity identifiers and respective values may be transmitted to the content distribution system (e.g., content communication system 220 of FIG. 2). A user may customize a content object distribution scheme at the content communication system using the attributes generated by the customer data platform 310.

Figure 4:
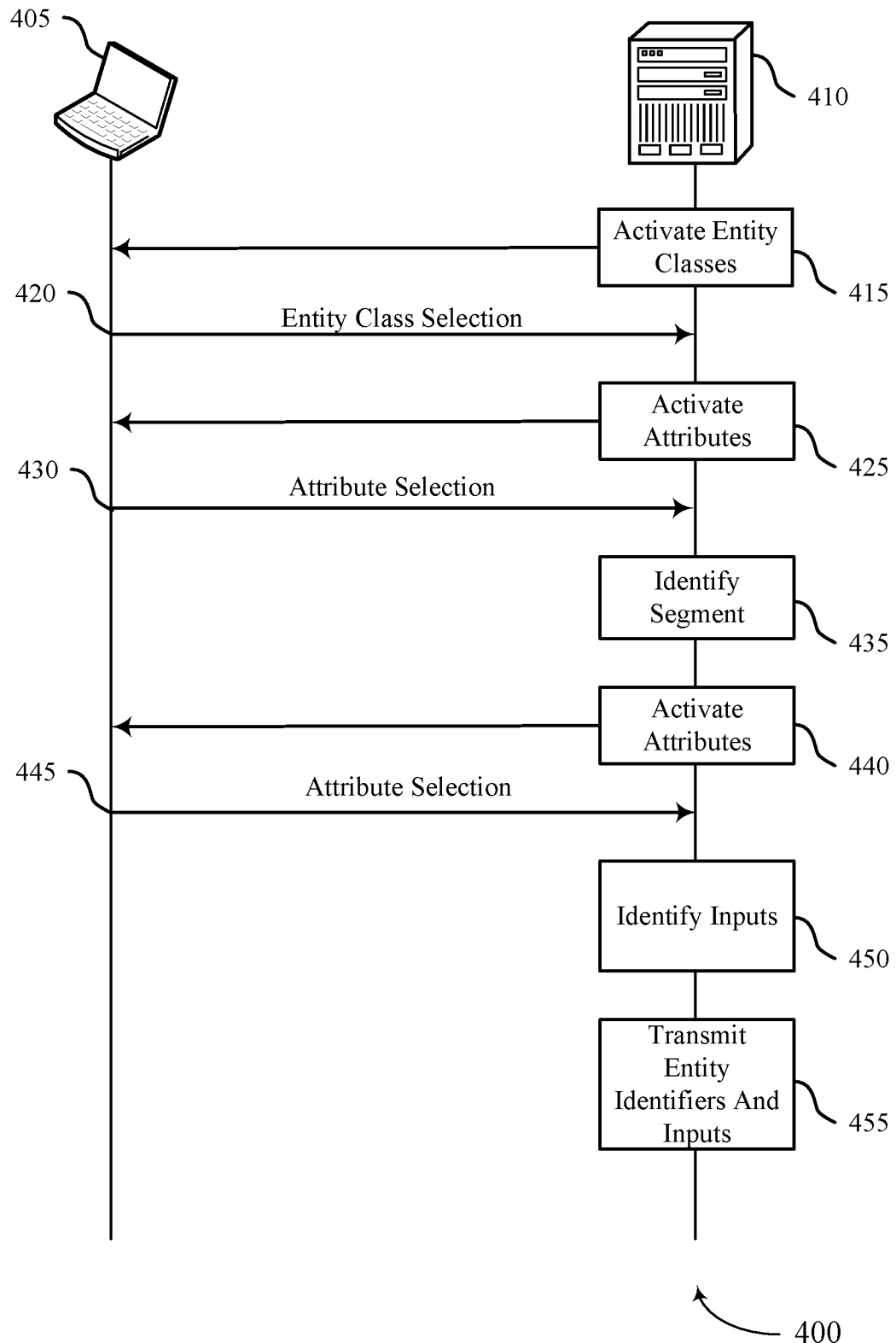
FIG. 4 illustrates an example of a process flow that supports declarative segment attribute activation in accordance with aspects of the present disclosure.

FIG. 4 illustrates an example of a process flow 400 that supports declarative segment attribute activation in accordance with aspects of the present disclosure. The process flow 400 may be implemented by a user device 405 and a server 410. The server 410 may be an example of or support a customer data platform 210 and 310 as described with respect to FIGS. 2 and 3. The user device 405 may be an example of a user device 205 and 305 as described with respect to FIGS. 2 and 3. A user may utilize user device 405 to access services, such as an entity segmentation service as described herein.

The user, using user device 405, may access the entity segmentation service. The service may support a user interface displayed at the user device 405. The user may be an employee (e.g., marketing manager) at tenant of a multi-tenant system supported by the server 410. The service may be accessed via a website or application at the user device 405. At 415, the server 410 may activate, for selection at the user interface, the plurality of entity classes based at least in part on a data model configured for a tenant. For example, the entity classes that the data model supports may be activated for selection. Activation may include causing the entity classes to be displayed at user device 405 for selection. Thus, activation may include transmitting a hypertext transfer protocol (HTTP) response to the user device 405 in response to a browser of the device navigating to the service. At 420, the server 410 may receive, via the user interface in response to activating the plurality of entity classes, a selection of the first entity class from the plurality of entity classes.

At 425, the server 410 may activate a set of attributes for selection at the user interface of the user device 405. The attributes may be activated based on the entity class selection and the data model. For example, the data model may support various attributes for different entity classes. Thus, those attributes that may be associated with the entity class that is selected may be activated for selection. At 430, the server 410, may receive via the user interface in response to activating the attributes, a selection of one or more attributes, one or more operators, etc. that define a declarative expression.

At 435, the server 410 may identify for communication of a content object, a segment of entities including entities of a first entity class of a plurality of entity classes defined by a data model configured for a tenant of a multi-tenant system. The segment may be identified based on a user selection of one or more attributes, operators, etc. of a declarative expression. In some examples, the user may select from one or more predefined segments. The data model may define one or more relationships between entity classes of the plurality of entity classes. For example, the data model may define that a group entity class may be a parent of various individual (e.g., individual or unified individual) entity classes, such that the individual entity classes may be considered child entities of the group entity class. The group entity class may correspond to a team, household, organization, or other groupings of individuals. Other relationships may be defined by the data model, as described herein.

At 440, the server 410 may activate, at the user interface for selection in combination with the segment of entities for communication of the content object, a set of attributes of the plurality of attributes based at least in part on the identified segment of entities and the data model. For example, the server 410 may activate (e.g., transmit an HTTP response such that the attributes are displayed) the attributes that are associated with the entity class associated with the segment according to the data model. In some cases, the server 410 may activate a set of predefined attributes that are associated with an expression or formula for identifying inputs. In some cases, the server 410 may activate one-to-many attributes, direct attributes, or both.

At 445, the server 410 may receive, based at least in part on activating the set of attributes, a selection of a second attribute of the set of attributes. The user may select multiple attributes, select an expression using operators and qualifiers, and various values. In some cases, the user may define a time domain for evaluating entities of the segment.

At 450, the server 410 may identify for the segment of entities, a set of inputs corresponding to the selected second attribute using the data model. The server 410 may generate a database query to identify the inputs. In some cases, the server 410 traverses the record for each entity of the segment of entries to identify values. In some cases, the server 410 may traverse each instance of an attribute for one or more entities to aggregate values or count attributes. Example inputs may be name, spend amount, birth date, gender, store visits, website visits, etc.

At 455, the server 410 may transmit to a content communication system for distribution of the content object, an indication of a plurality of entity identifiers corresponding to the segment of entities and the set of inputs. The indication may be a list or record of each entity identifier and respective attribute inputs (e.g., a comma separated value record). The content communication system may use the identifiers and the inputs to support a custom or personalized content distribution scheme.

Figure 5:
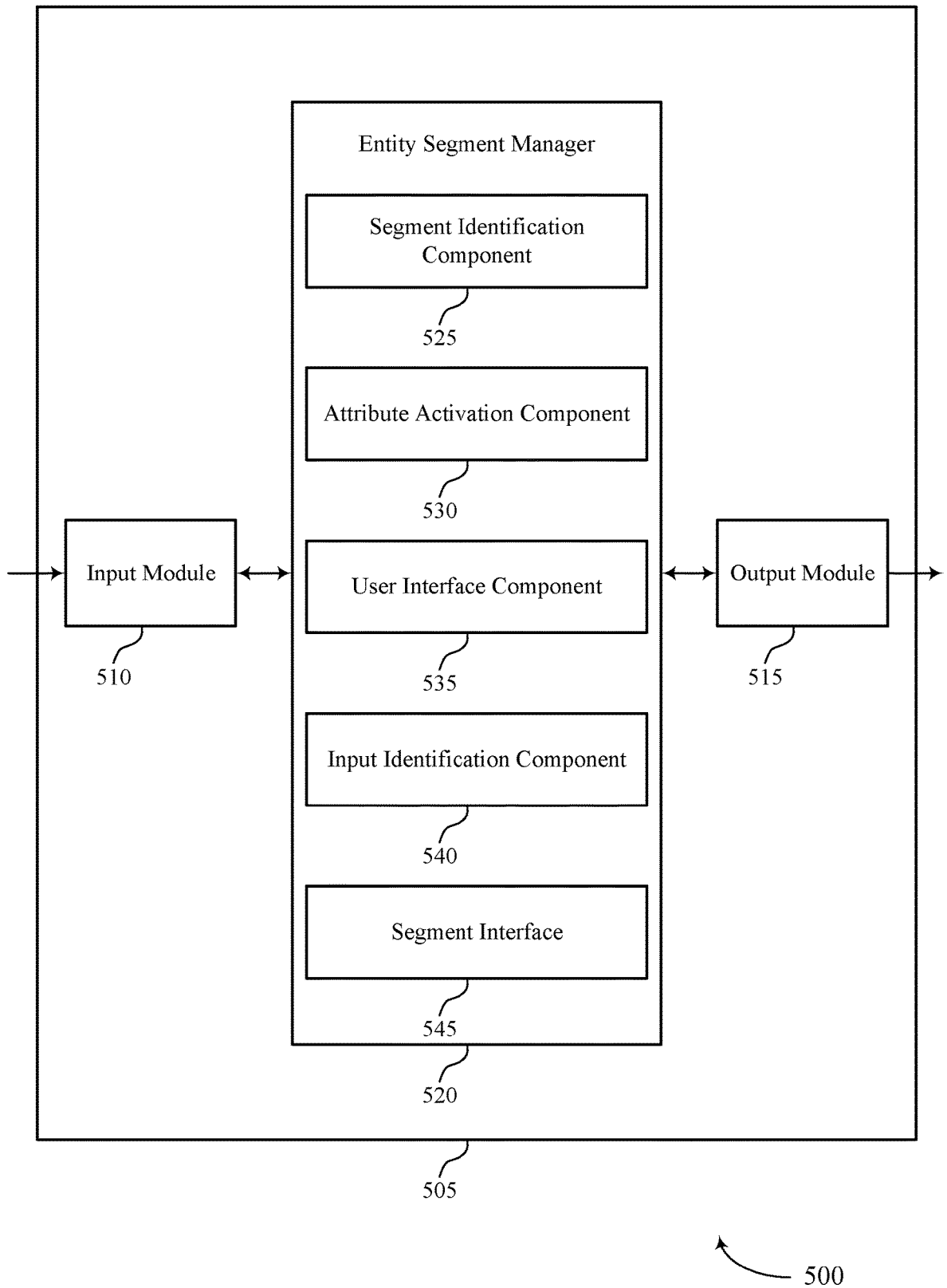
FIG. 5 shows a block diagram of an apparatus that supports declarative segment attribute activation in accordance with aspects of the present disclosure.

FIG. 5 shows a block diagram 500 of a device 505 that supports declarative segment attribute activation in accordance with aspects of the present disclosure. The device 505 may include an input module 510, an output module 515, and an entity segment manager 520. The device 505 may also include a processor. Each of these components may be in communication with one another (e.g., via one or more buses).

The input module 510 may manage input signals for the device 505 (e.g., apparatus). For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the entity segment manager 520 to support declarative segment attribute activation. In some cases, the input module 510 may be a component of an I/O controller 710 as described with reference to FIG. 7.

The output module 515 may manage output signals for the device 505 (e.g., apparatus). For example, the output module 515 may receive signals from other components of the device 505, such as the entity segment manager 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the entity segment manager 520 may include a segment identification component 525, an attribute activation component 530, a user interface component 535, an input identification component 540, a segment interface 545, or any combination thereof. In some examples, the entity segment manager 520, or various components thereof, may be configured to perform various operations (e.g., receiving, monitoring, transmitting) using or otherwise in cooperation with the input module 510, the output module 515, or both. For example, the entity segment manager 520 may receive information from the input module 510, send information to the output module 515, or be integrated in combination with the input module 510, the output module 515, or both to receive information, transmit information, or perform various other operations as described herein.

The entity segment manager 520 may support data processing in accordance with examples as disclosed herein. The segment identification component 525 may be configured as or otherwise support a means for identifying, for communication of a content object, a segment of entities based at least in part on a selection of a first attribute at a user interface, the first attribute selected from a plurality of attributes defined by a data model and configured for a tenant of a multi-tenant system. The attribute activation component 530 may be configured as or otherwise support a means for activating, at the user interface for selection in combination with the segment of entities for communication of the content object, a set of attributes of the plurality of attributes based at least in part on the identified segment of entities and the data model. The user interface component 535 may be configured as or otherwise support a means for receiving, based at least in part on activating the set of attributes, a selection of a second attribute of the set of attributes. The input identification component 540 may be configured as or otherwise support a means for identifying, for the segment of entities, a set of inputs corresponding to the selected second attribute using the data model. The segment interface 545 may be configured as or otherwise support a means for transmitting, to a content communication system for distribution of the content object, an indication of a plurality of entity identifiers corresponding to the segment of entities and the set of inputs.

Figure 6:
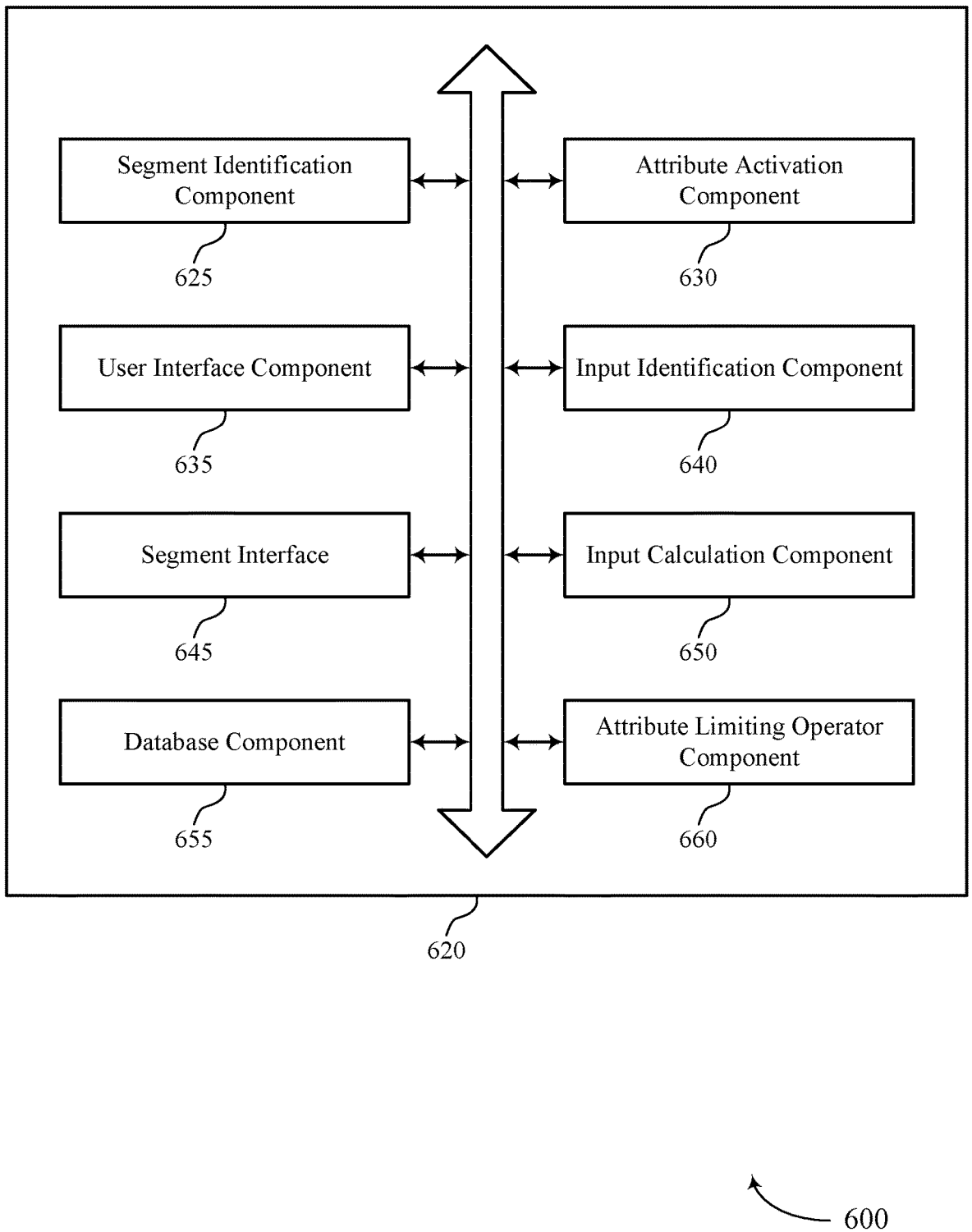
FIG. 6 shows a block diagram of an entity segment manager that supports declarative segment attribute activation in accordance with aspects of the present disclosure.

FIG. 6 shows a block diagram 600 of an entity segment manager 620 that supports declarative segment attribute activation in accordance with aspects of the present disclosure. The entity segment manager 620 may be an example of aspects of an entity segment manager or an entity segment manager 520, or both, as described herein. The entity segment manager 620, or various components thereof, may be an example of means for performing various aspects of declarative segment attribute activation as described herein. For example, the entity segment manager 620 may include a segment identification component 625, an attribute activation component 630, a user interface component 635, an input identification component 640, a segment interface 645, an input calculation component 650, a database component 655, an attribute limiting operator component 660, or any combination thereof. Each of these components may communicate, directly or indirectly, with one another (e.g., via one or more buses).

The entity segment manager 620 may support data processing in accordance with examples as disclosed herein. The segment identification component 625 may be configured as or otherwise support a means for identifying, for communication of a content object, a segment of entities based at least in part on a selection of a first attribute at a user interface, the first attribute selected from a plurality of attributes defined by a data model and configured for a tenant of a multi-tenant system. The attribute activation component 630 may be configured as or otherwise support a means for activating, at the user interface for selection in combination with the segment of entities for communication of the content object, a set of attributes of the plurality of attributes based at least in part on the identified segment of entities and the data model. The user interface component 635 may be configured as or otherwise support a means for receiving, based at least in part on activating the set of attributes, a selection of a second attribute of the set of attributes. The input identification component 640 may be configured as or otherwise support a means for identifying, for the segment of entities, a set of inputs corresponding to the selected second attribute using the data model. The segment interface 645 may be configured as or otherwise support a means for transmitting, to a content communication system for distribution of the content object, an indication of a plurality of entity identifiers corresponding to the segment of entities and the set of inputs.

In some examples, the input calculation component 650 may be configured as or otherwise support a means for calculating an input of the set of inputs for at least one entity of the segment of entities based at least in part on the second attribute being aggregable, wherein the set of inputs is identified based at least in part on calculating the input.

In some examples, to support calculating the input, the input calculation component 650 may be configured as or otherwise support a means for aggregating a set of values corresponding to each instance of the second attribute corresponding to the at least one entity.

In some examples, to support aggregating the set of values, the input calculation component 650 may be configured as or otherwise support a means for summing the set of values or averaging the set of values.

In some examples, the attribute limiting operator component 660 may be configured as or otherwise support a means for receiving, via the user interface, a selection of a time domain for the selected second attribute, wherein the calculating is performed based at least in part on the selection of the time domain.

In some examples, to support identifying the set of inputs, the database component 655 may be configured as or otherwise support a means for executing a database query, that is generated based at least in part on the selected second attribute, on the data model configured for the tenant, wherein executing the query results in each input of the set of inputs for the segment of entities.

In some examples, to support transmitting the indication of the plurality of entity identifiers corresponding to the segment of entities and the set of inputs, the segment interface 645 may be configured as or otherwise support a means for transmitting a record that includes a listing of the plurality of entity identifiers and a listing of the set of inputs, wherein each input of the set of inputs corresponds to a respective entity identifier of the set of entity identifiers based at least in part on the selected second attribute as defined in the data model.

In some examples, the user interface component 635 may be configured as or otherwise support a means for receiving, at the user interface, a selection of an entity class to be used for a basis for identifying the segment of entities, wherein the set of attributes are activated based at least in part on the set of attributes being associated with the selected entity class according to the data model.

In some examples, the content communication system is configured to distribute the content object to a client corresponding to each entity identifier of the plurality of entity identifiers based at least in part on the selected second attribute.

In some examples, the selected second attribute corresponds to a product, a purchase history, a store, an organization, user web behavior data, or a combination thereof.

Figure 7:
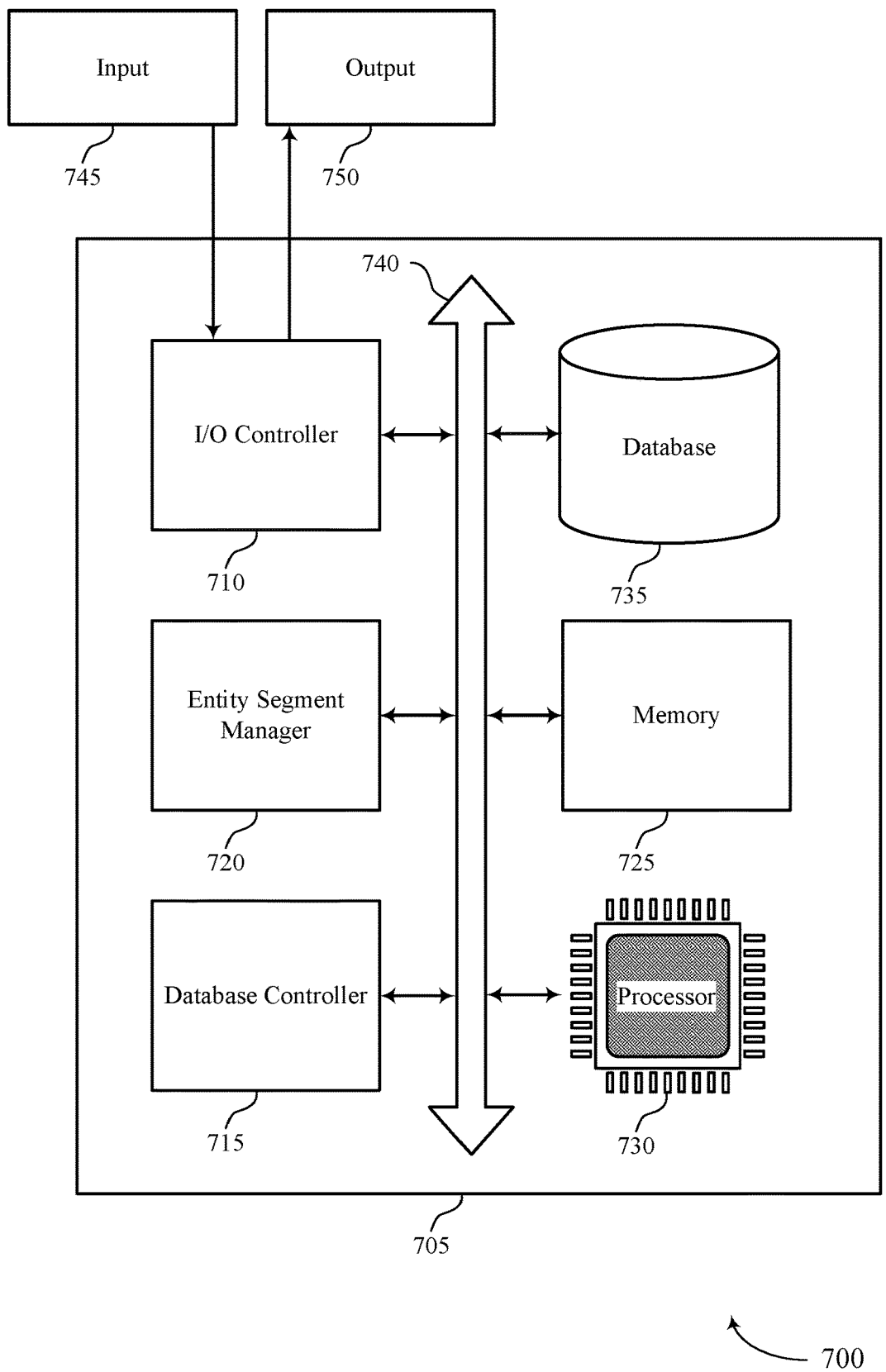
FIG. 7 shows a diagram of a system including a device that supports declarative segment attribute activation in accordance with aspects of the present disclosure.

FIG. 7 shows a diagram of a system 700 including a device 705 (e.g., apparatus) that supports declarative segment attribute activation in accordance with aspects of the present disclosure. The device 705 may be an example of or include the components of a device 505 as described herein. The device 705 may include components for bi-directional voice and data communications including components for transmitting and receiving communications, such as an entity segment manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor. In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting declarative segment attribute activation).

The entity segment manager 720 may support data processing in accordance with examples as disclosed herein. For example, the entity segment manager 720 may be configured as or otherwise support a means for identifying, for communication of a content object, a segment of entities based at least in part on a selection of a first attribute at a user interface, the first attribute selected from a plurality of attributes defined by a data model and configured for a tenant of a multi-tenant system. The entity segment manager 720 may be configured as or otherwise support a means for activating, at the user interface for selection in combination with the segment of entities for communication of the content object, a set of attributes of the plurality of attributes basing at least in part on the identified segment of entities and the data model. The entity segment manager 720 may be configured as or otherwise support a means for receiving, based at least in part on activating the set of attributes, a selection of a second attribute of the set of attributes. The entity segment manager 720 may be configured as or otherwise support a means for identifying, for the segment of entities, a set of inputs corresponding to the selected second attribute using the data model. The entity segment manager 720 may be configured as or otherwise support a means for transmitting, to a content communication system for distribution of the content object, an indication of a plurality of entity identifiers corresponding to the segment of entities and the set of inputs.

By including or configuring the entity segment manager 720 in accordance with examples as described herein, the device 705 may support techniques for reducing processing and memory overhead by supporting efficient attribute identification. Thus, rather than having to maintain separate datasets for use by a customer data platform and a content distribution system, which may utilize significant processing and memory resources, the system may use leverage data of a data model maintained by the content distribution system to support customized content distribution.

Figure 8:
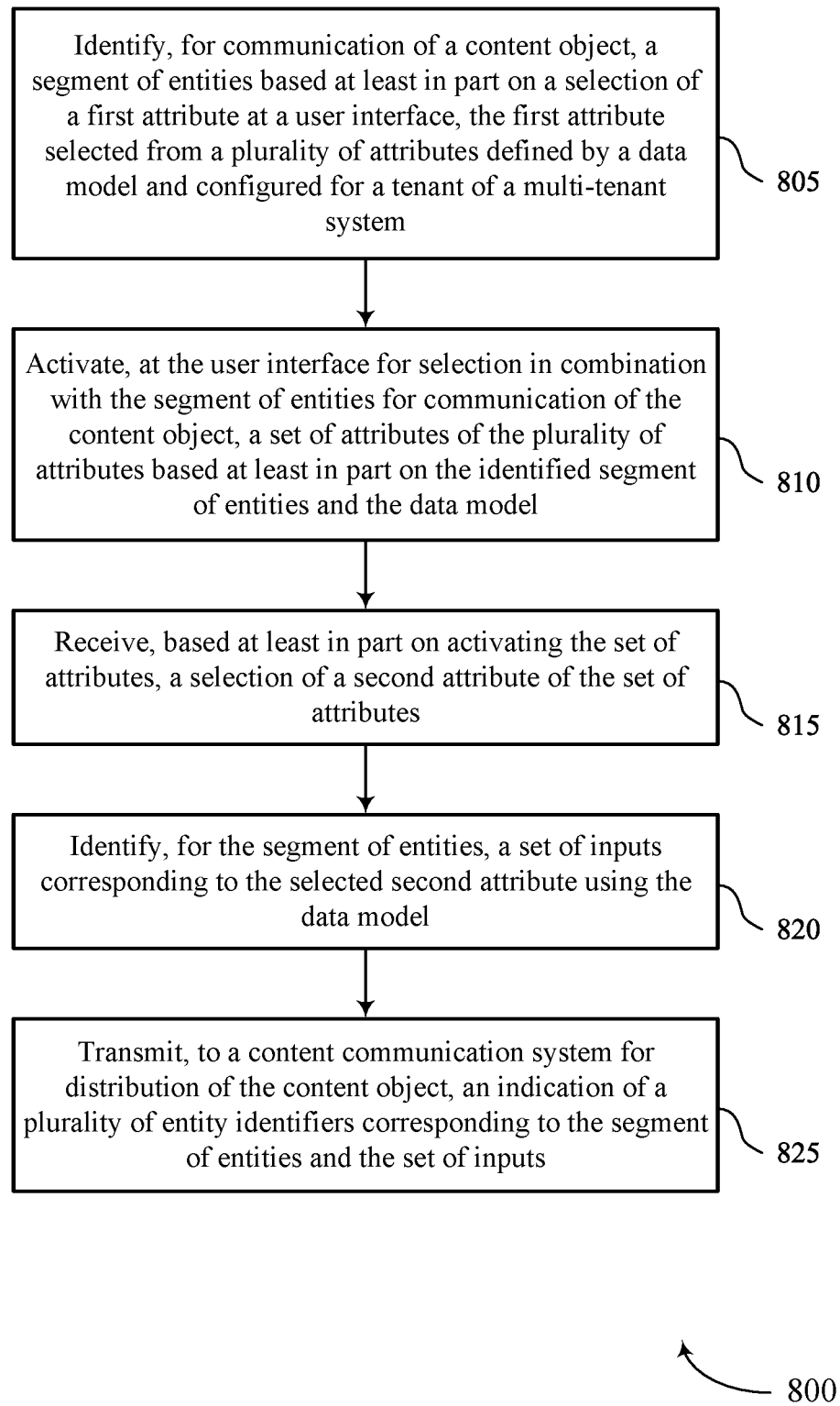
FIGS. 8 through 10 show flowcharts illustrating methods that support declarative segment attribute activation in accordance with aspects of the present disclosure.

FIG. 8 shows a flowchart illustrating a method 800 that supports declarative segment attribute activation in accordance with aspects of the present disclosure. The operations of the method 800 may be implemented by a server or device or its components as described herein. For example, the operations of the method 800 may be performed by a server as described with reference to FIGs. FIG. 1 through 7. In some examples, a server may execute a set of instructions to control the functional elements of the server to perform the described functions. Additionally or alternatively, the server may perform aspects of the described functions using special-purpose hardware.

At 805, the method may include identifying, for communication of a content object, a segment of entities based at least in part on a selection of a first attribute at a user interface, the first attribute selected from a plurality of attributes defined by a data model and configured for a tenant of a multi-tenant system. The operations of 805 may be performed in accordance with examples as disclosed herein. In some examples, aspects of the operations of 805 may be performed by a segment identification component 625 as described with reference to FIG. 6.

At 810, the method may include activating, at the user interface for selection in combination with the segment of entities for communication of the content object, a set of attributes of the plurality of attributes based at least in part on the identified segment of entities and the data model. The operations of 810 may be performed in accordance with examples as disclosed herein. In some examples, aspects of the operations of 810 may be performed by an attribute activation component 630 as described with reference to FIG. 6.

At 815, the method may include receiving, based at least in part on activating the set of attributes, a selection of a second attribute of the set of attributes. The operations of 815 may be performed in accordance with examples as disclosed herein. In some examples, aspects of the operations of 815 may be performed by a user interface component 635 as described with reference to FIG. 6.

At 820, the method may include identifying, for the segment of entities, a set of inputs corresponding to the selected second attribute using the data model. The operations of 820 may be performed in accordance with examples as disclosed herein. In some examples, aspects of the operations of 820 may be performed by an input identification component 640 as described with reference to FIG. 6.

At 825, the method may include transmitting, to a content communication system for distribution of the content object, an indication of a plurality of entity identifiers corresponding to the segment of entities and the set of inputs. The operations of 825 may be performed in accordance with examples as disclosed herein. In some examples, aspects of the operations of 825 may be performed by a segment interface 645 as described with reference to FIG. 6.

Figure 9:
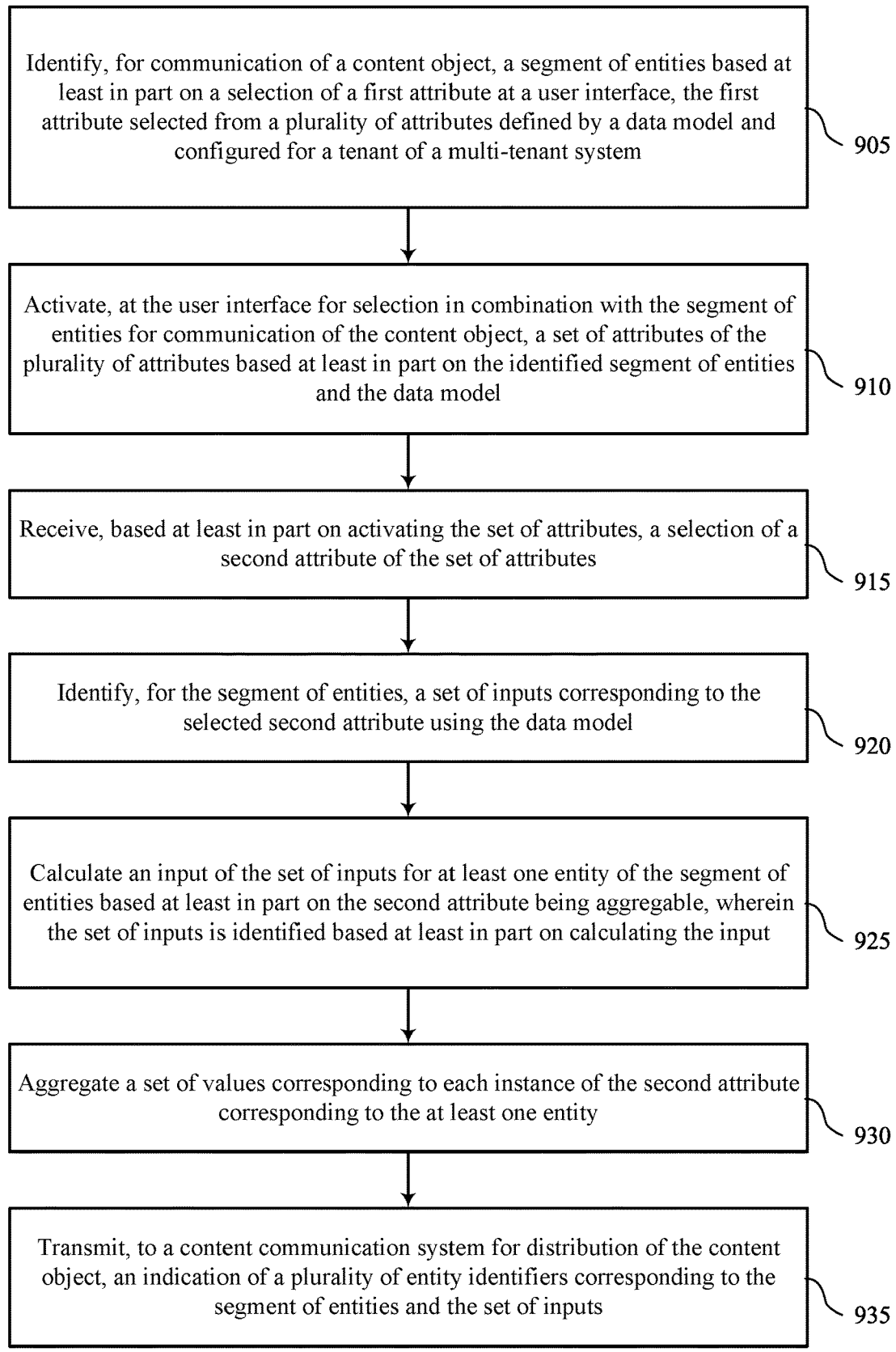

FIG. 9 shows a flowchart illustrating a method 900 that supports declarative segment attribute activation in accordance with aspects of the present disclosure. The operations of the method 900 may be implemented by a server or device or its components as described herein. For example, the operations of the method 900 may be performed by a server as described with reference to FIGs. FIG. 1 through 7. In some examples, a server may execute a set of instructions to control the functional elements of the server to perform the described functions. Additionally or alternatively, the server may perform aspects of the described functions using special-purpose hardware.

At 905, the method may include identifying, for communication of a content object, a segment of entities based at least in part on a selection of a first attribute at a user interface, the first attribute selected from a plurality of attributes defined by a data model and configured for a tenant of a multi-tenant system. The operations of 905 may be performed in accordance with examples as disclosed herein. In some examples, aspects of the operations of 905 may be performed by a segment identification component 625 as described with reference to FIG. 6.

At 910, the method may include activating, at the user interface for selection in combination with the segment of entities for communication of the content object, a set of attributes of the plurality of attributes based at least in part on the identified segment of entities and the data model. The operations of 910 may be performed in accordance with examples as disclosed herein. In some examples, aspects of the operations of 910 may be performed by an attribute activation component 630 as described with reference to FIG. 6.

At 915, the method may include receiving, based at least in part on activating the set of attributes, a selection of a second attribute of the set of attributes. The operations of 915 may be performed in accordance with examples as disclosed herein. In some examples, aspects of the operations of 915 may be performed by a user interface component 635 as described with reference to FIG. 6.

At 920, the method may include identifying, for the segment of entities, a set of inputs corresponding to the selected second attribute using the data model. The operations of 920 may be performed in accordance with examples as disclosed herein. In some examples, aspects of the operations of 920 may be performed by an input identification component 640 as described with reference to FIG. 6.

At 925, the method may include calculating an input of the set of inputs for at least one entity of the segment of entities based at least in part on the second attribute being aggregable, wherein the set of inputs is identified based at least in part on calculating the input. The operations of 925 may be performed in accordance with examples as disclosed herein. In some examples, aspects of the operations of 925 may be performed by an input calculation component 650 as described with reference to FIG. 6.

At 930, the method may include aggregating a set of values corresponding to each instance of the second attribute corresponding to the at least one entity. The operations of 930 may be performed in accordance with examples as disclosed herein. In some examples, aspects of the operations of 930 may be performed by an input calculation component 650 as described with reference to FIG. 6.

At 935, the method may include transmitting, to a content communication system for distribution of the content object, an indication of a plurality of entity identifiers corresponding to the segment of entities and the set of inputs. The operations of 935 may be performed in accordance with examples as disclosed herein. In some examples, aspects of the operations of 935 may be performed by a segment interface 645 as described with reference to FIG. 6.

Figure 10:
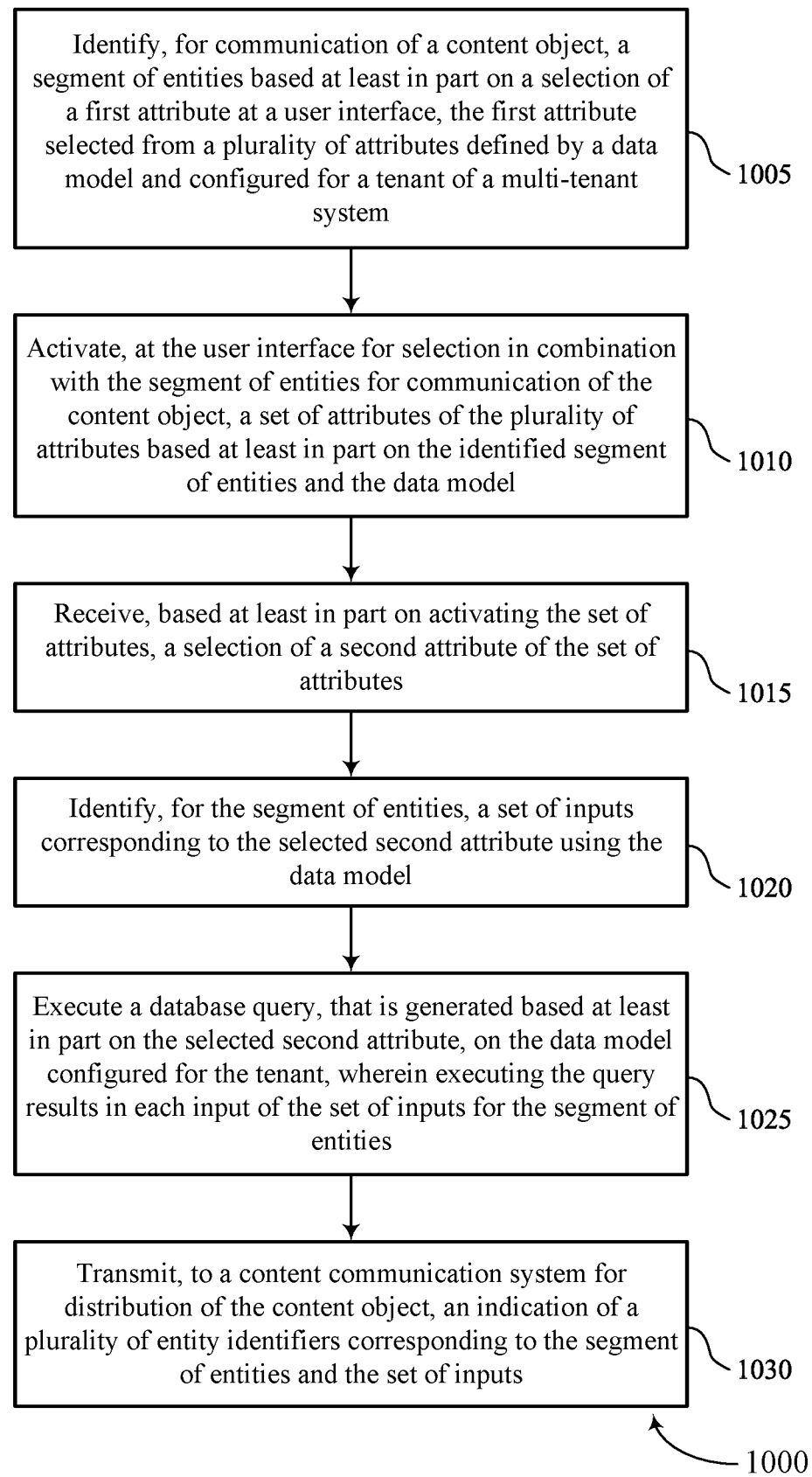

FIG. 10 shows a flowchart illustrating a method 1000 that supports declarative segment attribute activation in accordance with aspects of the present disclosure. The operations of the method 1000 may be implemented by a server or device or its components as described herein. For example, the operations of the method 1000 may be performed by a server as described with reference to FIGs. FIG. 1 through 7. In some examples, a server may execute a set of instructions to control the functional elements of the server to perform the described functions. Additionally or alternatively, the server may perform aspects of the described functions using special-purpose hardware.

At 1005, the method may include identifying, for communication of a content object, a segment of entities based at least in part on a selection of a first attribute at a user interface, the first attribute selected from a plurality of attributes defined by a data model and configured for a tenant of a multi-tenant system. The operations of 1005 may be performed in accordance with examples as disclosed herein. In some examples, aspects of the operations of 1005 may be performed by a segment identification component 625 as described with reference to FIG. 6.

At 1010, the method may include activating, at the user interface for selection in combination with the segment of entities for communication of the content object, a set of attributes of the plurality of attributes based at least in part on the identified segment of entities and the data model. The operations of 1010 may be performed in accordance with examples as disclosed herein. In some examples, aspects of the operations of 1010 may be performed by an attribute activation component 630 as described with reference to FIG. 6.

At 1015, the method may include receiving, based at least in part on activating the set of attributes, a selection of a second attribute of the set of attributes. The operations of 1015 may be performed in accordance with examples as disclosed herein. In some examples, aspects of the operations of 1015 may be performed by a user interface component 635 as described with reference to FIG. 6.

At 1020, the method may include identifying, for the segment of entities, a set of inputs corresponding to the selected second attribute using the data model. The operations of 1020 may be performed in accordance with examples as disclosed herein. In some examples, aspects of the operations of 1020 may be performed by an input identification component 640 as described with reference to FIG. 6.

At 1025, the method may include executing a database query, that is generated based at least in part on the selected second attribute, on the data model configured for the tenant, wherein executing the query results in each input of the set of inputs for the segment of entities. The operations of 1025 may be performed in accordance with examples as disclosed herein. In some examples, aspects of the operations of 1025 may be performed by a database component 655 as described with reference to FIG. 6.

At 1030, the method may include transmitting, to a content communication system for distribution of the content object, an indication of a plurality of entity identifiers corresponding to the segment of entities and the set of inputs. The operations of 1030 may be performed in accordance with examples as disclosed herein. In some examples, aspects of the operations of 1030 may be performed by a segment interface 645 as described with reference to FIG. 6.

A method for data processing is described. The method may include identifying, for communication of a content object, a segment of entities based at least in part on a selection of a first attribute at a user interface, the first attribute selected from a plurality of attributes defined by a data model and configured for a tenant of a multi-tenant system, activating, at the user interface for selection in combination with the segment of entities for communication of the content object, a set of attributes of the plurality of attributes based at least in part on the identified segment of entities and the data model, receiving, based at least in part on activating the set of attributes, a selection of a second attribute of the set of attributes, identifying, for the segment of entities, a set of inputs corresponding to the selected second attribute using the data model, and transmitting, to a content communication system for distribution of the content object, an indication of a plurality of entity identifiers corresponding to the segment of entities and the set of inputs.

An apparatus for data processing is described. The apparatus may include a processor, memory in electronic communication with the processor, and instructions stored in the memory. The instructions may be executable by the processor to cause the apparatus to identify, for communication of a content object, a segment of entities based at least in part on a selection of a first attribute at a user interface, the first attribute selected from a plurality of attributes defined by a data model and configured for a tenant of a multi-tenant system, activating, at the user interface for selection in combination with the segment of entities for communication of the content object, a set of attributes of the plurality of attributes based at least in part on the identified segment of entities and the data model, receive, based at least in part on activating the set of attributes, a selection of a second attribute of the set of attributes, identify, for the segment of entities, a set of inputs corresponding to the selected second attribute using the data model, and transmit, to a content communication system for distribution of the content object, an indication of a plurality of entity identifiers corresponding to the segment of entities and the set of inputs.

Another apparatus for data processing is described. The apparatus may include means for identifying, for communication of a content object, a segment of entities based at least in part on a selection of a first attribute at a user interface, the first attribute selected from a plurality of attributes defined by a data model and configured for a tenant of a multi-tenant system, means for activating, at the user interface for selection in combination with the segment of entities for communication of the content object, a set of attributes of the plurality of attributes based at least in part on the identified segment of entities and the data model, means for receiving, based at least in part on activating the set of attributes, a selection of a second attribute of the set of attributes, means for identifying, for the segment of entities, a set of inputs corresponding to the selected second attribute using the data model, and means for transmitting, to a content communication system for distribution of the content object, an indication of a plurality of entity identifiers corresponding to the segment of entities and the set of inputs.

A non-transitory computer-readable medium storing code for data processing is described. The code may include instructions executable by a processor to identify, for communication of a content object, a segment of entities based at least in part on a selection of a first attribute at a user interface, the first attribute selected from a plurality of attributes defined by a data model and configured for a tenant of a multi-tenant system, activating, at the user interface for selection in combination with the segment of entities for communication of the content object, a set of attributes of the plurality of attributes based at least in part on the identified segment of entities and the data model, receive, based at least in part on activating the set of attributes, a selection of a second attribute of the set of attributes, identify, for the segment of entities, a set of inputs corresponding to the selected second attribute using the data model, and transmit, to a content communication system for distribution of the content object, an indication of a plurality of entity identifiers corresponding to the segment of entities and the set of inputs.

Some examples of the method, apparatuses, and non-transitory computer-readable medium described herein may further include operations, features, means, or instructions for calculating an input of the set of inputs for at least one entity of the segment of entities based at least in part on the second attribute being aggregable, wherein the set of inputs may be identified based at least in part on calculating the input.

In some examples of the method, apparatuses, and non-transitory computer-readable medium described herein, calculating the input may include operations, features, means, or instructions for aggregating a set of values corresponding to each instance of the second attribute corresponding to the at least one entity.

In some examples of the method, apparatuses, and non-transitory computer-readable medium described herein, aggregating the set of values may include operations, features, means, or instructions for summing the set of values or averaging the set of values.

Some examples of the method, apparatuses, and non-transitory computer-readable medium described herein may further include operations, features, means, or instructions for receiving, via the user interface, a selection of a time domain for the selected second attribute, wherein the calculating may be performed based at least in part on the selection of the time domain.

In some examples of the method, apparatuses, and non-transitory computer-readable medium described herein, identifying the set of inputs may include operations, features, means, or instructions for executing a database query, that may be generated based at least in part on the selected second attribute, on the data model configured for the tenant, wherein executing the query results in each input of the set of inputs for the segment of entities.

In some examples of the method, apparatuses, and non-transitory computer-readable medium described herein, transmitting the indication of the plurality of entity identifiers corresponding to the segment of entities and the set of inputs may include operations, features, means, or instructions for transmitting a record that includes a listing of the plurality of entity identifiers and a listing of the set of inputs, wherein each input of the set of inputs corresponds to a respective entity identifier of the set of entity identifiers based at least in part on the selected second attribute as defined in the data model.

Some examples of the method, apparatuses, and non-transitory computer-readable medium described herein may further include operations, features, means, or instructions for receiving, at the user interface, a selection of an entity class to be used for a basis for identifying the segment of entities, wherein the set of attributes may be activated based at least in part on the set of attributes being associated with the selected entity class according to the data model.

In some examples of the method, apparatuses, and non-transitory computer-readable medium described herein, the content communication system may be configured to distribute the content object to a client corresponding to each entity identifier of the plurality of entity identifiers based at least in part on the selected second attribute.

In some examples of the method, apparatuses, and non-transitory computer-readable medium described herein, the selected second attribute corresponds to a product, a purchase history, a store, an organization, user web behavior data, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
identifying, for communication of a content object, a segment of entities of a plurality of entities of a data model based at least in part on a selection of a first attribute at a user interface, the first attribute selected from a plurality of attributes defined by the data model and configured for a tenant of a multi-tenant system;
activating, at the user interface for selection in combination with the segment of entities for communication of the content object and in response to identifying the segment of entities based on the selection of the first attribute, a set of attributes of the plurality of attributes based at least in part on the identified segment of entities and the data model;
receiving, based at least in part on activating the set of attributes, a selection of a second attribute of the set of attributes, wherein at least one entity of the segment of entities is associated with multiple numerical values for the second attribute via the data model;

identifying, for an entity of the at least one entity of the segment of entities, an input of a set of inputs based at least in part on aggregating the multiple numerical values for the second attribute associated with the entity, the set of inputs being associated with one or more entities of the identified segment of entities in the data model; and transmitting, to a content communication system for distribution of the content object, the set of inputs and an indication of a plurality of entity identifiers corresponding to the segment of entities.

2. The method of claim 1, wherein the multiple numerical values correspond to each instance of the second attribute corresponding to the entity.

3. The method of claim 1, further comprising:
receiving, via the user interface, a selection of a time domain for the selected second attribute, wherein the aggregating is performed based at least in part on the selection of the time domain.

4. The method of claim 1, further comprising:
identifying the set of inputs based at least in part on executing a database query, that is generated based at least in part on the selected second attribute, on the data model configured for the tenant, wherein executing the database query results in each input of the set of inputs for the segment of entities.

5. The method of claim 1, wherein transmitting the indication of the plurality of entity identifiers corresponding to the segment of entities and the set of inputs comprises:
transmitting a record that includes a listing of the plurality of entity identifiers and a listing of the set of inputs, wherein each input of the set of inputs corresponds to a respective entity identifier of the plurality of entity identifiers based at least in part on the selected second attribute as defined in the data model.

6. The method of claim 1, further comprising:
receiving, at the user interface, a selection of an entity class to be used for a basis for identifying the segment of entities, wherein the set of attributes are activated based at least in part on the set of attributes being associated with the selected entity class according to the data model.

7. The method of claim 1, wherein the content communication system is configured to distribute the content object to a client corresponding to each entity identifier of the plurality of entity identifiers based at least in part on the selected second attribute.

8. The method of claim 1, wherein the selected second attribute corresponds to a product, a purchase history, a store, an organization, user web behavior data, or a combination thereof.

9. The method of claim 1, further comprising:
identifying, for each entity of at least a subset of the identified segment of entities, a respective input of the set of inputs based at least in part on aggregating a respective set of multiple numerical values for the second attribute via the data model.

10. The method of claim 2, wherein aggregating the multiple numerical values comprises:
summing the multiple numerical values or averaging the multiple numerical values.

11. An apparatus for data processing, comprising:
a processor;
memory coupled with the processor; and
instructions stored in the memory and executable by the processor to cause the apparatus to:

identify, for communication of a content object, a segment of entities of a plurality of entities of a data model based at least in part on a selection of a first attribute at a user interface, the first attribute selected from a plurality of attributes defined by the data model and configured for a tenant of a multi-tenant system;

activating, at the user interface for selection in combination with the segment of entities for communication of the content object and in response to identifying the segment of entities based on the selection of the first attribute, a set of attributes of the plurality of attributes based at least in part on the identified segment of entities and the data model;

receive, based at least in part on activating the set of attributes, a selection of a second attribute of the set of attributes, wherein at least one entity of the segment of entities is associated with multiple numerical values for the second attribute via the data model;

identify, for an entity of the identified segment of entities, an input of a set of inputs based at least in part on aggregating the multiple numerical values for the second attribute associated with the entity, the set of inputs being associated with one or more entities of the identified segment of entities in the data model; and transmit, to a content communication system for distribution of the content object, the set of inputs and an indication of a plurality of entity identifiers corresponding to the segment of entities.

12. The apparatus of claim 11, wherein the multiple numerical values correspond to each instance of the second attribute corresponding to the entity.

13. The apparatus of claim 11, wherein the instructions are further executable by the processor to cause the apparatus to:
receive, via the user interface, a selection of a time domain for the selected second attribute, wherein the aggregating is performed based at least in part on the selection of the time domain.

14. The apparatus of claim 12, wherein the instructions to aggregate the multiple numerical values are executable by the processor to cause the apparatus to:
sum the multiple numerical values or averaging the multiple numerical values.

15. A non-transitory computer-readable medium storing code for data processing, the code comprising instructions executable by a processor to:
identify, for communication of a content object, a segment of entities of a plurality of entities of a data model based at least in part on a selection of a first attribute at a user interface, the first attribute selected from a plurality of attributes defined by the data model and configured for a tenant of a multi-tenant system;
activating, at the user interface for selection in combination with the segment of entities for communication of the content object and in response to identifying the segment of entities based on the selection of the first attribute, a set of attributes of the plurality of attributes based at least in part on the identified segment of entities and the data model;
receive, based at least in part on activating the set of attributes, a selection of a second attribute of the set of attributes, wherein at least one entity of the segment of entities is associated with multiple numerical values for the second attribute via the data model;

identify, for an entity of the identified segment of entities, an input of a set of inputs based at least in part on aggregating the multiple numerical values for the second attribute associated with the entity, the set of inputs being associated with one or more entities of the identified segment of entities in the data model; and transmit, to a content communication system for distribution of the content object, the set of inputs and an indication of a plurality of entity identifiers corresponding to the segment of entities.

16. The non-transitory computer-readable medium of claim 15, wherein the multiple numerical values correspond to each instance of the second attribute corresponding to the entity.

17. The non-transitory computer-readable medium of claim 15, wherein the instructions are further executable by the processor to:

receive, via the user interface, a selection of a time domain for the selected second attribute, wherein the aggregating is performed based at least in part on the selection of the time domain.

18. The non-transitory computer-readable medium of claim 16, wherein the instructions to aggregate the multiple numerical values are executable by the processor to:

sum the multiple numerical values or averaging the multiple numerical values.

* * * * *